(12) United States Patent
Burchardt et al.

(10) Patent No.: US 12,110,861 B2
(45) Date of Patent: Oct. 8, 2024

(54) SEGMENTED ROTOR BLADE FOR A WIND TURBINE

(71) Applicant: Siemens Gamesa Renewable Energy A/S, Brande (DK)

(72) Inventors: Claus Burchardt, Gistrup (DK); Allan Hurup, Nibe (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/890,293

(22) Filed: Jun. 2, 2020

(65) Prior Publication Data

US 2020/0392937 A1 Dec. 17, 2020

(30) Foreign Application Priority Data

Jun. 14, 2019 (EP) .................................. 19180271

(51) Int. Cl.
F03D 1/06 (2006.01)

(52) U.S. Cl.
CPC ......... F03D 1/0677 (2023.08); F03D 1/0675 (2013.01); *F03D 1/0633* (2013.01); *F05B 2240/302* (2013.01); *F05B 2250/292* (2013.01)

(58) Field of Classification Search
CPC .... F03D 1/0675; F03D 1/0683; F03D 1/0633; F03D 1/0644; F03D 1/0658; F05B 2240/302
See application file for complete search history.

(56) References Cited

U.S. PATENT DOCUMENTS

| | | | | |
|---|---|---|---|---|
| 7,654,799 B2 * | 2/2010 | Eyb | ...................... | F03D 1/0675 416/229 R |
| 7,922,454 B1 * | 4/2011 | Riddell | .................. | F03D 80/30 416/224 |
| 7,998,303 B2 * | 8/2011 | Baehmann | ............ | F03D 1/0675 156/305 |
| 8,142,164 B2 * | 3/2012 | Rao | ...................... | F03D 1/0675 416/232 |
| 8,348,622 B2 * | 1/2013 | Bech | .................. | B29C 66/1162 416/229 R |
| 8,777,573 B2 * | 7/2014 | Hibbard | .................. | F03D 13/10 416/132 B |

(Continued)

FOREIGN PATENT DOCUMENTS

CN 101922406 A * 12/2010
CN 102200100 A 9/2011

(Continued)

OTHER PUBLICATIONS

English translation of ES2510893A1 (Year: 2014).*

(Continued)

*Primary Examiner* — Woody A Lee, Jr.
*Assistant Examiner* — Esley Le Fisher
(74) *Attorney, Agent, or Firm* — Schmeiser, Olsen & Watts LLP

(57) ABSTRACT

Provide is a rotor blade for a wind turbine, including a hollow blade body with a root and a tip, wherein the blade body is split along a split plane into two body parts, one extending from the root to a first connection section and the other extending from a second connection section to the tip, wherein the first and the second connection sections are adapted to overlap each other in the connected position.

15 Claims, 3 Drawing Sheets

(56) References Cited

U.S. PATENT DOCUMENTS

| | | | |
|---|---|---|---|
| 9,797,369 B2 * | 10/2017 | Kratmann | F03D 1/0633 |
| 9,920,630 B2 * | 3/2018 | Dahl | F03D 1/0675 |
| 10,495,058 B2 * | 12/2019 | Shain | F03D 1/0675 |
| 10,947,852 B2 * | 3/2021 | Schuring | F01D 5/147 |
| 11,286,908 B2 * | 3/2022 | Lund-Laverick | F03D 13/10 |
| 2011/0123343 A1 * | 5/2011 | Ronner | F03D 1/0683 |
| | | | 416/226 |
| 2011/0142675 A1 | 6/2011 | van der Bos | |
| 2011/0293432 A1 * | 12/2011 | Hibbard | F03D 13/10 |
| | | | 416/223 R |
| 2012/0321376 A1 * | 12/2012 | Walters | B29C 65/42 |
| | | | 403/267 |
| 2015/0010406 A1 * | 1/2015 | Torgard | F01D 5/147 |
| | | | 416/230 |
| 2015/0110632 A1 * | 4/2015 | Rohden | F03D 1/0633 |
| | | | 416/210 R |
| 2015/0292477 A1 * | 10/2015 | Kratmann | F03D 1/0675 |
| | | | 416/232 |
| 2017/0145986 A1 | 5/2017 | Baehmann et al. | |
| 2018/0238300 A1 | 8/2018 | Shain et al. | |
| 2020/0088169 A1 * | 3/2020 | Lund-Laverick | F03D 1/0675 |

FOREIGN PATENT DOCUMENTS

| | | | | |
|---|---|---|---|---|
| CN | 102374113 A | | 3/2012 | |
| EP | 2749765 A1 | | 7/2014 | |
| EP | 2902620 A1 | * | 8/2015 | F03D 1/0675 |
| ES | 2510893 A1 | * | 10/2014 | |
| GB | 2489477 A | * | 10/2012 | B29D 99/0025 |
| WO | WO-2018215457 A1 | * | 11/2018 | F03D 1/0675 |

OTHER PUBLICATIONS

English translation of CN101922406A (Year: 2010).*

European Search Report and Written Opinion of the European Searching Authority issued Dec. 9, 2019 for Application No. 19180271.9.

* cited by examiner

SEGMENTED ROTOR BLADE FOR A WIND TURBINE

CROSS-REFERENCE TO RELATED APPLICATIONS

This application claims priority to European Application No. 19180271.9, having a filing date of Jun. 14, 2019, the entire contents of which are hereby incorporated by reference.

FIELD OF TECHNOLOGY

The following relates to a rotor blade for a wind turbine, comprising a hollow blade body with a root and a tip.

BACKGROUND

Wind turbines usually comprise at least two, in most appliances three rotor blades which are attached to a hub. The rotor blades interact with the wind making the hub rotate. As the hub is coupled to a generator, electric energy is produced as is commonly known.

Wind turbines are installed on shore, but also offshore wind turbines are well known. Especially offshore wind turbines were increased in size over the years. With an increasing height of the wind turbine tower, also the length of the rotor blades increases. This makes the production and transportation of the rotor blade difficult.

SUMMARY

An aspect relates to an improved rotor blade.

For solving the problem a rotor blade for a wind turbine, comprising a hollow blade body with a root and a tip, is provided, which is characterised in that the blade body is split along a split plane into two body parts, one extending from the root to a first connection section and the other extending from a second connection section to the tip, wherein the first and the second connection sections are adapted to overlap each other in the connected position.

The inventive rotor blade is split into two blade body parts, which are due to their reduced length easier to produce. Also, the handling and transportation to the installation side is simplified. They can then be connected to each other on site, so that the complete long rotor blade may then be mounted to the hub.

In a preferred embodiment the split plane is in an area where the blade has a convex peripheral geometry. The overall shape of the rotor blade usually changes a lot from the root, where the cross section is cylindrical, to the tip having an air foil like cross section. Over the length, usually starting close to the root, the circumference respectively the cross section widens to a maximum and gets smaller towards the tip, also changing the cross-section geometry. According to the preferred embodiment, the split plane is arranged in an area, where the blade has a convex peripheral geometry, seen from the side of the blade. In this area the cross section respectively the circumference either still widens, is in its maximum or reduces slightly, but in any way is relatively large, so that a large overlap of the first and second connection section in the connected position is realised.

In an alternative it is also possible to arrange the split plane in an area where the rotor blade has a single curved cross section seen in the direction from the root to the tip. A singled curved cross section means that the cross section has a circular, oval or egg-shaped form. It does not change the direction, but has always, seen from the inner of the blade, a convex circumference along the split plane. This geometry in the split plane region is advantageous for a simple connection of the two body parts.

In a preferred embodiment, the split plane is in an area where the blade has a convex peripheral geometry and where it has a single curved cross section seen in the direction from the root to the tip. In this embodiment the split plane is arranged in an area where a convex peripheral geometry and a single curved cross section is given. This embodiment allows to combine the positive effects of both split plane positions. Both possible positions enhance the structural performance and enable a lighter and stronger connection. If now according to this inventive embodiment both of these possible positions are chosen for arranging this split plane, the positive structural and mechanical advantages can be used.

In a further embodiment of the rotor blade the first connection section and the second connection section have a conical geometry adapted to insert one connection section into the other connection section. This conical geometry allows for an easier alignment and assembly of the two body parts, while also the overlapping section allows for a simple but mechanically strong connection of the body parts. The respective conical geometries at both connection sections are quite simple to produce and allow a simple assembly, as both connection sections simply need to be pushed into one another.

In an alternative to providing the conical geometries at the connection sections, it is possible that at least one connection section has a stepped geometry. This connection section preferably has a reduced diameter and an abutment shoulder. The other connection section has a larger inner diameter, so that the stepped connection section can be pushed into the other connection section, which abuts with its front surface at the abutment shoulder. It is certainly also possible to provide such an abutment shoulder also at the second connection section, which may have a larger inner diameter at the connection section, so that both connection sections are stepped, one having a reduced outer diameter, the other having an enlarged inner diameter, and are pushed into one another overlapping each other and abutting at the respective abutment shoulders.

In any way, no matter if the conical geometry or the stepped geometry is provided at the connection section(s), the connection sections are designed for interlocking with a form fit, so that they perfectly fit into one another. This form fit interlocking means that in the overlapping area the body parts respectively connection sections are attached to each other without larger gaps or slits, but are directly attached to each other, so that a certain fixture is already given right after attaching the body parts to each other without providing special fixation or connection means.

Preferably the first connection section being provided at the body part comprising the root is inserted into the second connection section being provided at the body part with the tip.

Another preferred embodiment is characterised in that at the first connection section and/or at the second connection section one or more slits extending from the end edge over at least a part of the length of the connection section are provided. While at least one slit is advantageous, preferably several slits, arranged around the circumference and equally distanced to each other, are provided. This slit or these slits enhance the flexibility of the first and/or second connection section, which allows an even better form fit connection of the body parts. The slit or the slits are directed towards the root respectively the tip. If more than one slit is provided, the slits define a kind of flexible fingers extending at the free end edge of the respective connection section.

For connecting the body parts respectively for stiffening the connection a connection or stiffening means extending at the inner surfaces and bridging the transition region from the first connection section to the second connection section are provided. These connection or stiffening means are preferably arranged or attached to the inner surface, so that the outer surface is smooth and both body parts merge without a remarkable step or shoulder or groove at the outer surface.

The connection or stiffening means comprises one or more webs or sheets attached to the inner surface. These webs or sheets allow to cover larger areas and are quite easy to be very firmly attached to the respective inner surface. Among these webs or sheets the connection or stiffening means may comprise at least one web or sheet extending along the inner circumference for at least 360 degrees. This ring-shaped web or sheet covers the whole ring-shaped transition area and is attached to both inner surfaces of the body parts. It may extend remarkably far into the respective body parts, so that the attachment area or region at both body parts is remarkably large for firmly anchoring the web or sheet at the respective surfaces.

Alternatively, or additionally the connection or stiffening means may also comprise several band- or strip-like webs or sheets extending in a longitudinal direction over the transition region and being distanced to each other along the inner circumference. The band- or strip-like webs or sheets are also firmly anchored and fixed to the respective inner surfaces bridging the transition region. They are preferably arranged together with the circular web or sheet and extend into the respective body parts even longer than this ring-shaped web or sheet. The band- or strip-like webs or sheets are preferably equally distanced to each other arranged along the inner circumference, so that a uniform distribution is realised.

The webs or sheets, no matter which web or sheet is attached, are preferably attached by means of a hardened bonding agent, by lamination or by vacuum assisted resin transfer molding. There are several ways to tightly anchor or embed the webs at the respective surfaces. No matter which way is chosen, they all are based on bonding or gluing the respective web tightly to the respective body part.

The split plane itself is preferably at the inboard section of the blade body closer to the root, as in this area preferably the respective convex and single curved geometry is provided.

Beside the rotor blade itself embodiments of the invention also refers to a wind turbine, comprising a rotor blade with at least one rotor blade as described above.

BRIEF DESCRIPTION

Some of the embodiments will be described in detail, with references to the following Figures, wherein like designations denote like members, wherein.

DETAILED DESCRIPTION

Figure 1:
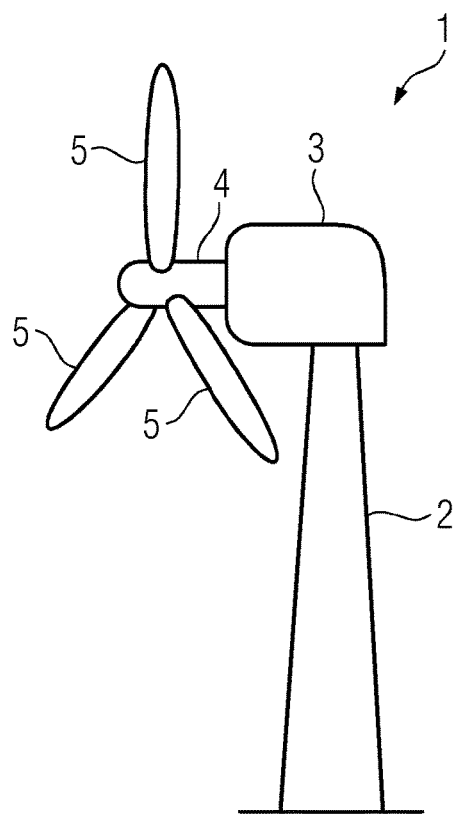
FIG. 1 shows a principle sketch of a wind turbine comprising three rotor blades.

FIG. 1 shows an inventive wind turbine 1, comprising a tower 2 with a nacelle 3 and a hub 4, at which hub in this embodiment three inventive rotor blades 5 are attached. As commonly known, the rotor blades 5 interact with the wind making the hub 4 rotate. This rotation drives a generator arranged in the nacelle 3 for producing electric energy.

Figure 2:
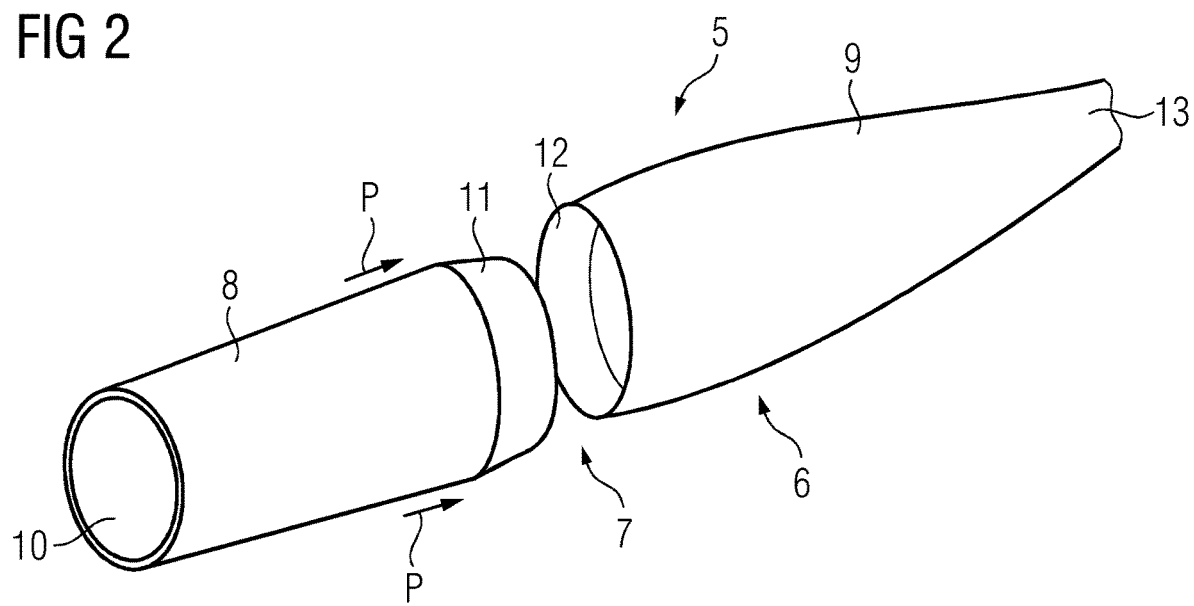
FIG. 2 shows a perspective exploded sketch of a rotor blade of a first embodiment.

FIG. 2 shows a principle sketch in form of an exploded view of a rotor blade 5 according to a first embodiment. In the following several embodiments are described. The same reference numbers will be used for the same or comparable parts of the respective embodiment.

The rotor blade 5 as shown in FIG. 2 comprises a hollow blade body 6 which is split along a split plane 7 into two body parts 8, 9, which can be, as shown by the arrows P, pushed into each other respectively connected to each other. The first blade body 8 extends from a root 10 to a first connection section 11, while the second body part 9 extends from a second connection section 12 to a tip 13.

Figure 3:
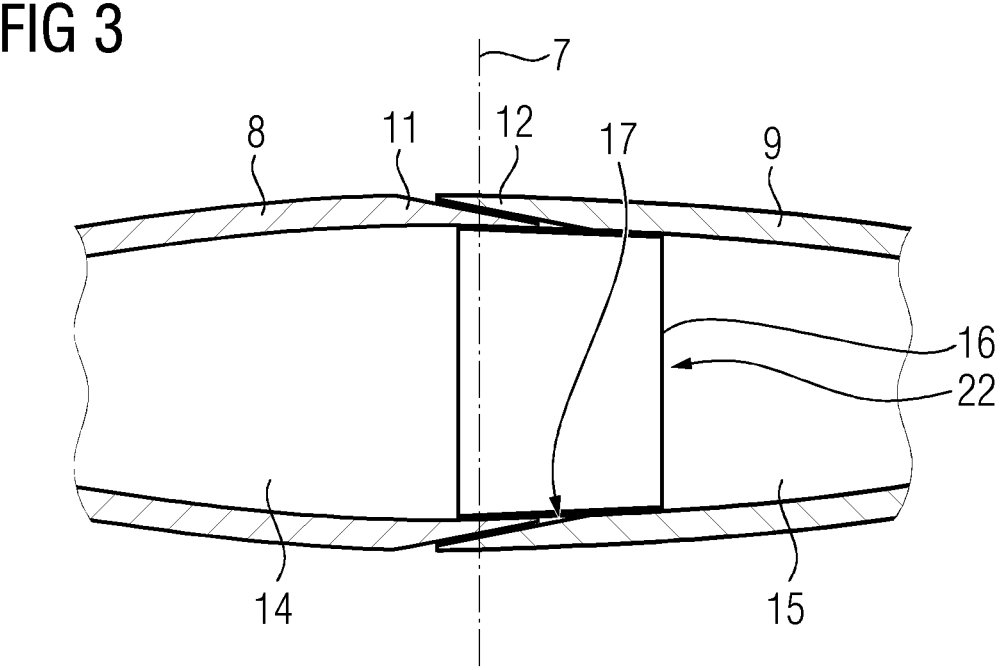
FIG. 3 shows a partial sketch of a cross section of the rotor blade in the connection area of the two body parts with a web-like connection of stiffening means being provided.

In the connected position, as shown in FIG. 3, which shows a partial cross sectional view of the rotor blade 5 of FIG. 2, the body parts 8, 9 are pushed with their respective connection section 11, 12 into each other, wherein in this embodiment the first connection section 11 of the first body part 8 is pushed into the second connection section 12 of the second body part 9. As FIG. 3 shows, both connection sections 11, 12 are conical allowing for a simple alignment and assembly of the connection sections 11, 12 and for attaching them to each other with a form fit as shown in FIG. 3.

The split plane 7 is arranged in an area of the rotor blade 5, where the blade has, as shown in FIG. 3, a convex peripheral geometry seen from the side of the blade. As can be clearly seen in FIG. 3, the circumference widens from the left to a kind of maximum circumference in the area of the split plane 7 and narrows then again.

Furthermore, the split plane 7 is arranged in an area where the blade has a single curved cross section, as is shown in the exploded view in FIG. 1. The cross section of the connection sections 11, 12 is circular respectively oval, thus the connection sections have a single curved cross section respectively are convex all around the circumference seen from the inner of the blade. Arranging the split plane 7 in the convex and single curved area as explained above enhances the structural performance and enables a lighter and stronger connection of both body parts 8, 9 together with the form fit connection of the connection sections 11, 12 preferably via the conical geometries of the connection sections 11, 12.

FIG. 3 shows a connection or stiffening means 22 being provided at the inner surfaces 14, 15 of the respective body parts 8, 9 respectively the respective connection sections 11, 12. This connection or stiffening means 22 comprises a web 16, for example a glass fiber web or carbon fiber web or the like, which has a ring form and extends around at least 360 degrees along the inner circumference covering the transition region 17, where the inner surface 14 changes to the inner surface 15. The web 16 extends in the longitudinal direction into both body parts 8, 9 and overlaps a certain area of the inner surfaces 14, 15, to which it is tightly embedded by means of a hardened bonding agent or by lamination or by vacuum assisted resin transfer molding or the like. This web 16 connects the body parts 8, 9 and stiffens the connection and also transfers the shear loads from one body part to the other body part.

Figure 4:
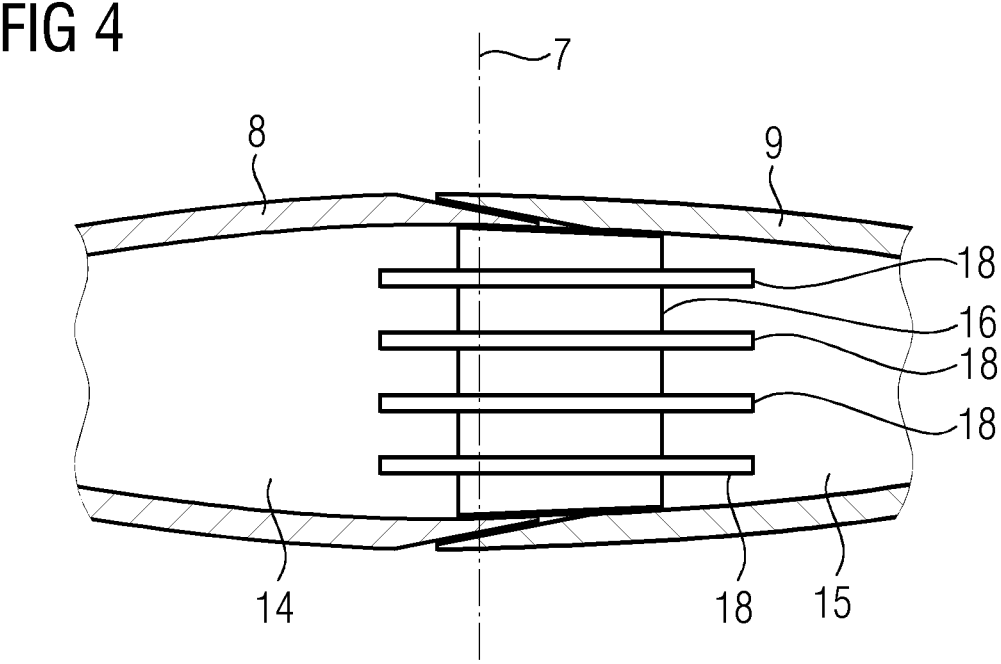
FIG. 4 shows a sketch according to FIG. 3 with further web-like connection or stiffening means being provided.

FIG. 4 shows a view according to FIG. 3, where in addition to the web 16 several further band- or strip-like webs 18 are attached to the respective inner surfaces 14, 15 extending even further into the respective body part 8, 9. They obviously extend over the web 16 and the respective transition region 17 and are used for further improving the connection respectively the stiffening and the shear load transfer.

Certainly, additional fixation mean may be used for fixing the body parts 8, 9 to each other in the overlapping connection sections, for example bolt-nut-connections or the like, which are not shown in detail. It is clear that the connection of the body parts 8, 9 needs to be as firm as possible due to the forces acting on the rotor blade and thus on the connection area when in motion.

Figure 5:
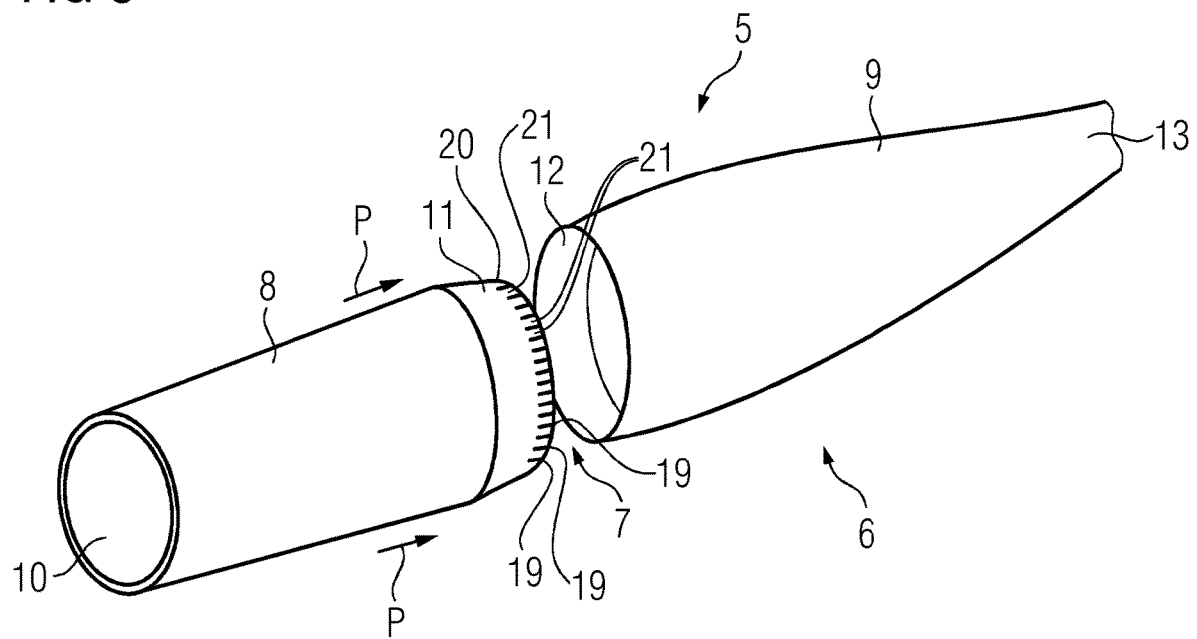
FIG. 5 shows a principle sketch of a rotor blade according to a second embodiment in an exploded view.

Finally FIG. 5 shows another embodiment of an inventive rotor blade 5 again comprising a hollow blade body 6 which is split along a split plane 7 into two body parts 8, 9, the one extending from the root 10 to a first connection section 11 and the other one extending from a second connection section 12 to a tip 13. Also in this embodiment the split plane 7 is provided in an area where the rotor blade 5 has a convex peripheral geometry seen from the side of the blade and where it has a single curved cross section seen in the direction from the root to the tip, as already explained with regard to FIG. 1.

In this embodiment the connection section 11 shows several slits 19 extending from the end edge 20 over at least a part of the length of the connection section 11. These slits 19 are preferably equally distributed around the circumference and define respective flexible fingers 21. These flexible fingers 21 enhance the flexibility of the connection section 11 which is advantageous for the good form fit of the connection sections 11, 12.

While the fingers 21 are only provided at the first connection section 11, it is also possible to provide the second connection 12 with the respective fingers 21 or to provide both connections 11, 12 with fingers 21.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine, comprising
a hollow blade body with a root and a tip wherein the hollow blade body is split along a split plane into a first body part and a second body part, the first body part extending from the root to a first connection section and the second body part extending from a second connection section to the tip;
wherein the first connection section and the second connection section are configured to overlap each other in a connected position;
wherein the split plane is in an area where the rotor blade has a convex peripheral geometry and where the rotor blade has a single curved cross-section seen in a direction from the root to the tip;
wherein a circumference of the first body part continuously decreases from the first connection section to an end of the root, and a circumference of the second body part continuously increases from the tip towards the second connection section;
wherein the first connection section and the second connection section have a conical geometry configured to insert one connection section into the other connection section, the conical geometry of the first connection section defined by an outer circumference gradually decreasing towards the split plane, and the conical geometry of the second connection section defined by an inner circumference gradually increasing towards the split plane.

2. The rotor blade according to claim 1, wherein the single curved cross section is circular, oval or egg-shaped.

3. The rotor blade according to claim 1, wherein the first connection section and the second connection section are interlocked with a form fit.

4. The rotor blade according to claim 1, wherein the first connection section is inserted into the second connection section.

5. The rotor blade according to claim 1, further comprising, at the first connection section and/or at the second connection section, one or more slits extending from an end edge over at least a part of a length of the first connection section and/or the second connection section.

6. The rotor blade according to claim 1, further comprising a connection or a stiffening means extending at inner surfaces and bridging a transition region from the first connection section to the second connection section.

7. The rotor blade according to claim 6, wherein the connection or the stiffening means comprises one or more webs or sheets attached to the inner surfaces.

8. The rotor blade according to claim 7, wherein the connection or the stiffening means comprises at least one web or sheet extending along an inner circumference for at least 360 degrees.

9. The rotor blade according to claim 7, wherein the connection or the stiffening means comprises several band- or strip-like webs or sheets extending in a longitudinal direction over the transition region and being distanced to each other along an inner circumference.

10. The rotor blade according to claim 7, wherein the webs or sheets are attached by means of a hardened bonding agent, by lamination or by vacuum assisted resin transfer molding.

11. The rotor blade according to claim 1, wherein the split plane is at an inboard section of the hollow blade body.

12. A wind turbine, comprising a rotor with at least one rotor blade according to claim 1.

13. The rotor blade according to claim 1, wherein the circumference of the first body part decreases at the first connection section such that the first connection section is tapered.

14. The rotor blade according to claim 13, wherein the second connection section is tapered.

15. The rotor blade according to claim 1, wherein the first body part and the second body part have conical geometries.

* * * * *